US007548854B2

(12) United States Patent
Roy et al.

(10) Patent No.: US 7,548,854 B2
(45) Date of Patent: Jun. 16, 2009

(54) ARCHITECTURAL SOUND ENHANCEMENT WITH PRE-FILTERED MASKING SOUND

(75) Inventors: Kenneth P. Roy, Holtwood, PA (US); Thomas J. Johnson, Chesterfield, MS (US); Ronald Fuller, Burbank, CA (US); Steve Dove, Lebanon, PA (US)

(73) Assignee: AWI Licensing Company, Wilmington, DE (US)

( * ) Notice: Subject to any disclaimer, the term of this patent is extended or adjusted under 35 U.S.C. 154(b) by 734 days.

(21) Appl. No.: 10/109,137

(22) Filed: Mar. 28, 2002

(65) Prior Publication Data

US 2003/0144848 A1 Jul. 31, 2003

Related U.S. Application Data

(60) Provisional application No. 60/353,936, filed on Jan. 31, 2002.

(51) Int. Cl.
*G01L 21/02* (2006.01)

(52) U.S. Cl. ....................... 704/226; 704/233; 704/234; 381/73.1; 381/83

(58) Field of Classification Search ................. 704/500, 704/226, 233, 234; 381/73.1, 83
See application file for complete search history.

(56) References Cited

U.S. PATENT DOCUMENTS 3,636,281 A 1/1972 Cozart ........................ 179/181
3,767,005 A 10/1973 Bertagni ...................... 181/32
3,961,378 A 6/1976 White ......................... 29/594
4,052,564 A * 10/1977 Propst et al. ............... 381/73.1
4,252,211 A 2/1981 Matsuda et al. ............. 181/166
4,319,088 A * 3/1982 Orfield ....................... 381/73.1
4,476,572 A * 10/1984 Horrall et al. .............. 381/73.1

(Continued)

FOREIGN PATENT DOCUMENTS

WO WO 97/09858 3/1997

(Continued)

OTHER PUBLICATIONS

"BW 2000 Flat Panel," www.ladydragon.com, Aug. 14, 1999.

(Continued)

*Primary Examiner*—Daniel D Abebe

(57) ABSTRACT

A unique, fully integrated, fully programmable, and highly flexible sound distribution system and methodology for providing masking sound, background music, and paging capabilities in up to eight zones of a building or space is provided. The methodology embodied in the system includes internal masking sounds that are uniquely pre-filtered to provide efficient and effective masking of distracting sounds within selectable zones of the space with a minimum masking sound dB sound level and with a pleasant sounding and non-annoying masking sound. The system also incorporates the capacity to be controlled from a remote or local telephone to adjust the volume level in any zone serviced by the system by issuing appropriate DTMF codes from the telephone's keypad. Unique bi-tone diagnostic functions are provided for assuring that the entire system is correctly wired and installed and for troubleshooting operational anomalies. ⅓ octave equalization is provided to compensate for known frequency response characteristics of the flat panel radiators of the system and to compensate for varying room acoustics to provide a low special variation of sound among the various zones of the space. The result is a high quality high fidelity sound that is consistent from zone to zone.

24 Claims, 4 Drawing Sheets

U.S. PATENT DOCUMENTS

| | | | | |
|---|---|---|---|---|
| 4,686,693 | A * | 8/1987 | Ritter | 381/73.1 |
| 4,928,312 | A | 5/1990 | Hill | 381/192 |
| 4,939,784 | A | 7/1990 | Bruney | 381/202 |
| 5,007,707 | A | 4/1991 | Bertagni | 350/118 |
| 5,082,083 | A | 1/1992 | Draffen | 181/150 |
| 5,283,836 | A | 2/1994 | Trufitt | 381/199 |
| 5,693,917 | A | 12/1997 | Bertagni et al. | 181/173 |
| 5,701,359 | A | 12/1997 | Guenther et al. | 381/203 |
| 5,802,191 | A | 9/1998 | Guenther | 381/188 |
| 5,828,766 | A | 10/1998 | Gallo | 381/190 |
| 6,031,926 | A | 2/2000 | Azima et al. | 381/423 |
| 6,044,159 | A | 3/2000 | Schmertmann et al. | 381/186 |
| 6,097,829 | A | 8/2000 | Guenther et al. | 381/425 |
| 6,164,408 | A | 12/2000 | Lamm et al. | 181/30 |
| 6,171,534 | B1 | 1/2001 | Leach et al. | 264/102 |
| 6,176,345 | B1 | 1/2001 | Perkins et al. | 181/173 |
| 6,181,797 | B1 | 1/2001 | Parrella et al. | 381/86 |
| 6,215,881 | B1 * | 4/2001 | Azima et al. | 381/152 |
| 6,247,551 | B1 | 6/2001 | Heron | 181/173 |
| 6,304,435 | B1 | 10/2001 | Hsu | 361/683 |
| 6,304,661 | B1 | 10/2001 | Azima et al. | 381/152 |
| 6,324,294 | B1 | 11/2001 | Azima et al. | 381/381 |
| 6,327,369 | B1 | 12/2001 | Azima et al. | 381/152 |
| 6,332,029 | B1 | 12/2001 | Azima et al. | 381/152 |
| 6,347,149 | B1 | 2/2002 | Bachmann et al. | 381/396 |
| 2001/0017924 | A1 | 8/2001 | Azima et al. | 381/165 |
| 2001/0017927 | A1 | 8/2001 | Bachmann et al. | 381/395 |
| 2001/0038701 | A1 | 11/2001 | Corynen | 381/152 |
| 2001/0048751 | A1 | 12/2001 | Ellis | 381/431 |
| 2001/0055403 | A1 | 12/2001 | Bachmann et al. | 381/190 |
| 2002/0015507 | A1 | 2/2002 | Harris et al. | 381/431 |
| 2002/0021812 | A1 | 2/2002 | Bank | 381/152 |
| 2002/0027999 | A1 | 3/2002 | Azima et al. | 381/431 |
| 2002/0039430 | A1 | 4/2002 | Nakaso | 381/396 |
| 2003/0091199 | A1 * | 5/2003 | Horrall et al. | 381/73.1 |
| 2003/0103632 | A1 * | 6/2003 | Goubran et al. | 381/73.1 |

FOREIGN PATENT DOCUMENTS

| | | |
|---|---|---|
| WO | WO 98/31188 | 7/1998 |
| WO | WO 98/39947 | 9/1998 |
| WO | WO 98/43464 | 10/1998 |
| WO | WO 98/52381 | 11/1998 |
| WO | WO 98/52383 | 11/1998 |
| WO | WO 99/02012 | 1/1999 |
| WO | WO 99/08479 | 2/1999 |
| WO | WO 99/11490 | 3/1999 |
| WO | WO 99/12387 | 3/1999 |
| WO | WO 99/13684 | 3/1999 |
| WO | WO 99/21397 | 4/1999 |
| WO | WO 99/37121 | 7/1999 |
| WO | WO 99/41939 | 8/1999 |
| WO | WO 99/52324 | 10/1999 |
| WO | WO 99/65274 | 12/1999 |

OTHER PUBLICATIONS

"Hang 'em High," www.PopularMechanics.com, Sep. 1998.

Chiu, Jason, "Benwin Flat Panel Speaker," www.hardwarecentral.com, Apr. 19, 2002.

* cited by examiner

ARCHITECTURAL SOUND ENHANCEMENT WITH PRE-FILTERED MASKING SOUND

CLAIM OF PRIORITY

Priority to the filing date of U.S. provisional patent application Ser. No. 60/353,936 filed on Jan. 31, 2002 is hereby claimed.

TECHNICAL FIELD

This invention relates generally to sound distribution systems for buildings and more particularly to sound distribution systems providing masking sound, paging, and music in office space and other environments.

BACKGROUND

The distribution of sound, such as background music and paging announcements, throughout spaces such as office complexes, churches, schools, entertainment parks, government buildings, transit parks, and the like has long been one of the tasks of sound system designers and the architects who design such facilities. One traditional method of distributing sound throughout such facilities has been simply to mount an array of cone-type loudspeakers in the suspended ceilings of the facilities and connect the speakers to an audio amplifier driven by a music and/or paging, masking sound, or other sound source. In many cases, paging and masking sound has been distributed throughout a facility with separate sound systems, although in some cases these functions have been integrated into a single system.

While traditional methods of sound distribution throughout a space has been somewhat successful, they nevertheless are plagued with inherent problems. These problems include, among others, the generally low fidelity of the resulting sound, the difficulty of reconfiguring the speaker array when a floor plan changes; the inherent directional and non-diffuse character of the sound produced by traditional cone-type loudspeakers, which can be distracting; relative loud and quiet areas as one moves about the space; interference patterns as a result of the spaced-apart speakers producing correlated sound; and the changing and sometimes harsh sounding characteristics of the audio program with varying room acoustics within the space. Some of the problems associated with cone-type loudspeakers have been addressed by the assignee of the present invention and others through the development of flat panel sound radiators, which fit within the grid of a suspended ceiling and visually are virtually indistinguishable from a traditional ceiling panel. Pending U.S. patent applications owned by the assignee of the present invention entitled Flat Panel Sound Radiator with Enhanced Audio Performance, Flat Panel Sound Radiator with Bridge Supported Exciter and Compliant Surround, and others disclose such flat panel sound radiators, and their disclosures are hereby incorporated by reference.

Distracting noise in the workplace is not a new problem, but is one that is garnering increasing attention as workplace configurations and business models evolve. A number of recent studies indicate that noise, and particularly conversations of others, is the single largest distraction within the workplace and has a significant negative impact on worker productivity. As the service sector of the economy grows, more and more workers find themselves in offices rather than manufacturing facilities. The need for flexible, reconfigurable space for these workers has resulted in greater use of open plan workspaces; large rooms with reduced ceiling height and moveable re-configurable partitions that define the workstations or cubicles for workers. Unfortunately, distracting sounds tend to propagate over and through the partition walls to disturb workers in adjacent workstations. In addition, the density of workstations is increasing with more workers occupying a given physical space. Further, more workers use speakerphones and conferencing technologies, and computers with large sound reflective screens, personal sound systems, and even voice recognition systems for communicating vocally with the computer. All of these factors, and others, have contributed to the progressive increase in the level of distracting noises and their corresponding negative impact on productivity within the workplace.

Generally, two approaches have been taken to mitigate the presence of distracting sounds in a space. The distracting sound either can be attenuated as it travels from its source to minimize its intrusion into adjacent spaces or it can be covered up or masked by introducing acoustically and spatially tailored masking sounds into the space. Sound attenuation is not always practical or effective, especially in workspaces made up of partitioned cubicles and open doorways and hallways. As a result, electronic sound masking techniques increasingly have been employed to mask and neutralize distracting sounds. A recent paper asserts that:

> Sound masking systems are one of the more critical elements in preventing conversational speech from being a distraction in the work environment. They are necessary even when high performance ceiling systems and furniture systems have been installed because they ensure that when the variable air volume systems are moving low quantities of air, enough background ambient sound is present to prevent conversations from being overheard and understood. Sound masking provides electronically generated background sound to achieve normal levels of privacy. (Excerpted from Sound Solutions, a professional paper sponsored by ASID, Armstrong World Industries, Dynasound, Inc., Milliken & Co., and Steelcase, Inc.)

The principles of sound masking involve the introduction into a space of sound that is tailored to mask the targeted distracting noises. The introduction of masking sounds with a predetermined frequency profile within the frequency spectrum of the human voice, for example, provides a masking effect, in essence drowning out distracting human conversations. A typical sound masking system may include a “pink noise” or “white noise” generator, an audio amplifier and frequency filter set, and a system of connected loudspeakers arrayed throughout the space to reproduce the masking sounds and generally to create a uniform sound field within the space. In fact, uniformity of the masking sound field is a key factor in rendering the masking sounds unobtrusive to occupants. To this end, many traditional masking sound systems include cone-type loudspeakers positioned in the plenum space above the suspended ceiling. In this way, it is hoped that the sound will be diffused as it is reflected off plenum structures and transmitted through the ceiling tiles into the space. Unfortunately, the quality and sonic characteristics of the resulting sound field are generally poor, unpredictable, change with the configuration and contents of the plenum space, change with the type of ceiling tile, and cannot easily be tailored to compensate for the spatially varying acoustic response of the space below the suspended ceiling.

The use of flat panel sound radiators, mentioned above, in sound masking systems can enhance the ability to produce a diffuse and uniform masking sound field within a space and thus can solve many of the problems of traditional plenum mounted masking sound systems. This is due in part to the distributed mode reproduction of such radiators, which results in a less directional sound field, as opposed to the pistonic mode reproduction of traditional cone-type loudspeakers, which results in a more directional sound field. Further, since flat panel radiators project sound directly into a space rather than into the plenum above a suspended ceiling, the prospect of tailoring the sound produced by the radiators to compensate for varying acoustic properties of the space is viable. Flat panel radiators projecting diffuse sound directly into a space provides numerous other opportunities for improvements over traditional masking sound and audio distribution systems, as will become more apparent as the present invention is disclosed below.

While much research and development has been directed to the implementation of masking sound in the workplace to mask distracting noise, prior art implementations still have had significant shortcomings. For example many systems have used so-called "white noise" as the masking sound. Generally, white noise is sound characterized by an equal power distribution as a function of frequency within a particular audio spectrum of interest, and has a characteristic "shhhhhhhh" sound. The problem with white noise is that the human ear perceives the equal power spectrum as being louder at higher frequencies than at lower frequencies, and thus the white noise can itself be distracting or annoying to workers within a workspace. Further, white noise does not follow well the loudness distribution in the frequency domain of typical human speech to be masked, and thus the masking effect varies with frequency.

Most have attempted to address these problems by filtering the white noise in an attempt to replicate in the space a masking sound having a so-called equal loudness or NC40 distribution to produce masking sound characterized not by an equal power distribution but rather by an equal perceived loudness distribution as a function of frequency. While NC40 filtered masking sound is somewhat more efficient at masking distracting sounds, and particularly human speech, the inventors have discovered that it can have an annoying effect upon persons within the space, particularly after prolonged exposure. It is believed that this results from a power or level distribution that is increased at the low and high frequencies and that is decreased at mid-level frequencies. In addition, NC40 filtered masking sound generally requires a slightly higher decibel (dB) level for effective masking of the human voice. For these and other reasons, equal loudness or NC40 filtered masking sound has not proven optimum for masking sound applications in workspaces.

There exists a need in the field of sound distribution for an integrated masking sound, music, and paging system and methodology for buildings such as office spaces that addresses and solves the problems and shortcomings of traditional, often discrete, prior art systems. More specifically, such a system should take full advantage of modern high fidelity flat panel sound radiator technology to produce a diffuse and consistent sound field within a space, especially when reproducing masking sounds, and to produce high quality background music and paging. Masking sounds should be carefully tailored to provide optimum masking of human speech and other distracting sounds within the space with a minimum dB level and without the masking sounds themselves being distracting or annoying to workers, as can be the case with pink and white noise and NC40 filtered masking sound. The audio quality of music and paging sounds should be high fidelity, regardless of the acoustic characteristics of the space itself, and should be consistent sounding as one moves through areas of the space having differing or varying acoustics. For instance, if one moves from an acoustically reflective zone of the space to an acoustically absorptive zone, music and paging sounds should not change from a bright sound to a dull sound and the perceived level of the sounds should remain the same. The system for implementing the needed functions should be pre-engineered, highly integrated into easily installed, easily set-up, easily controlled, and easily adjustable components. Control and adjustment of sound affecting parameters should be provided either by local access, preferably through a computer based graphical user interface (GUI), or from a common telephone, which may be located either on site or at a remote location. The system should include extensive self diagnostic capabilities for monitoring the internal condition of electronic components and software and for diagnosing external wiring and installation related problems throughout the system. It is to the provision of an integrated sound distribution and masking sound system and methodology that addresses these and other needs that the present invention is primarily directed.

SUMMARY OF THE INVENTION

Briefly described, the present invention, in a preferred embodiment thereof, comprises an improved and completely integrated audio signal processing methodology embodied in a sound distribution system for providing masking sound, background music, and paging capability in a space such as, for example, a large office complex or other facility. System components include an array of flat panel sound radiators installed in the suspended ceiling system of the space and segregated into up to eight zones having differing sound requirements. The flat panel radiators in each zone are driven by one of eight channels of an audio power amplifier array. The channels of the audio power amplifiers receive signals from the eight outputs of an integrated sound processor, which processes and routes paging, music, masking sound, and test tones in a variety of unique ways to provide maximum sound quality and highly effective and spatially uniform masking within the various zones of the space. The methodology of the invention generally is embodied in these processing and routing functions, which are implemented primarily through software in a digital signal processor or DSP within the processor.

The inventions include, among other things, a unique masking sound pre-filter methodology and a unique pre-filter spectrum discovered by the inventors. The implementation of this unique masking sound pre-filter methodology is related to the incorporation and use of flat panel sound radiators, which project sound directly into a space rather than into the plenum above a suspended ceiling. In traditional plenum mounted masking systems, it is not possible to know in advance what input filter spectrum will be required to achieve a desired masking sound spectrum in the space. This is because the final masking sound spectrum produced in the space is highly dependant on the specific ceiling tile being used as well as the type and layout of any inclusions within the plenum space. Such inclusions include air ducts, water and utility pipes, support beams, air mixing boxes, and the like. Penetrations through the ceiling plane, including un-ducted return air grills into the plenum, return air lighting fixtures, etc. also affect the spectrum of masking sound produced in the space by plenum mounted speakers. This dependency on plenum and ceiling structure is not present for the system of the present invention since the flat panel radiators of the system fire directly into the space and not into the plenum. Thus, it is possible to identify a specific masking sound spectrum that is desired in the space itself and then create this spectrum with a high degree of accuracy by pre-filtering the masking sound signal with a pre-filter having a spectrum that is substantially the same as the desired spectrum. This same filter is applicable to all installations and the tedious tweaking and custom equalization adjustments required when installing prior art plenum mounted masking sound systems is eliminated. In the present invention, one pre-filter fits all.

Any desirable masking sound spectrum can be pre-programmed into the input pre-filter according to the present invention. However, a specific spectrum has been discovered to be particularly well suited to masking sound applications, and specifically for masking human speech. This spectrum, characterized generally by an essentially constant negative slope within the frequency range of the human voice, produces a masking sound that is natural sounding, less annoying than NC40 filtered masking sound, and that provides effective masking of the human voice at a dB level less that that required of an NC40 filtered masking sound. An additional invention relating to the use of a pre-filtered known masking sound signal is that when the radiators and room responses are tuned to correspond to the pre-filtered masking sound spectrum, then the entire system (radiator and room) is tuned to a flat response. This enables paging and other signals to be applied directly to the system without additional tuning required other than for the frequency response of a microphone or telephone used for paging announcements. In this way the pre-filtering of the masking signal also serves as an internal calibration signal for the external system.

The inventions disclosed herein further include the capacity to control the volume within any zone of a facility from a remote location or from within the facility or zone itself using DTMF codes entered on a telephone keypad. A unique system diagnostic function is provided that includes internal component status monitoring and the ability to employ combinations of input mutes and bi-tone test signal routing to diagnose faulty wiring and other problems external to the processor and power amplifiers. Also, the processor provides extensive equalization (EQ) capabilities at its outputs to allow compensation for known frequency response characteristics of the flat panel radiators of the system and compensation for room acoustics in each of the up to eight zones within a space. These and many other functions of the system are accessible and controllable through a graphic user interface (GUI) implemented on a computer coupled to the processor through a standard communications port.

Thus, an enhanced sound distribution system is now provided that addresses the problems and shortcomings of the prior art and that far exceeds the capabilities of prior art masking, music, and paging sound systems in its flexibility, controllability, sound quality, and masking sound efficiency. These and other features, objects, and advantages of the system, methodology, and functionality of the invention will become more apparent upon review of the detailed description set forth below when taken in conjunction with the accompanying drawing figures, which are briefly described as follows.

DETAILED DESCRIPTION OF THE PREFERRED EMBODIMENTS

Figure 1:
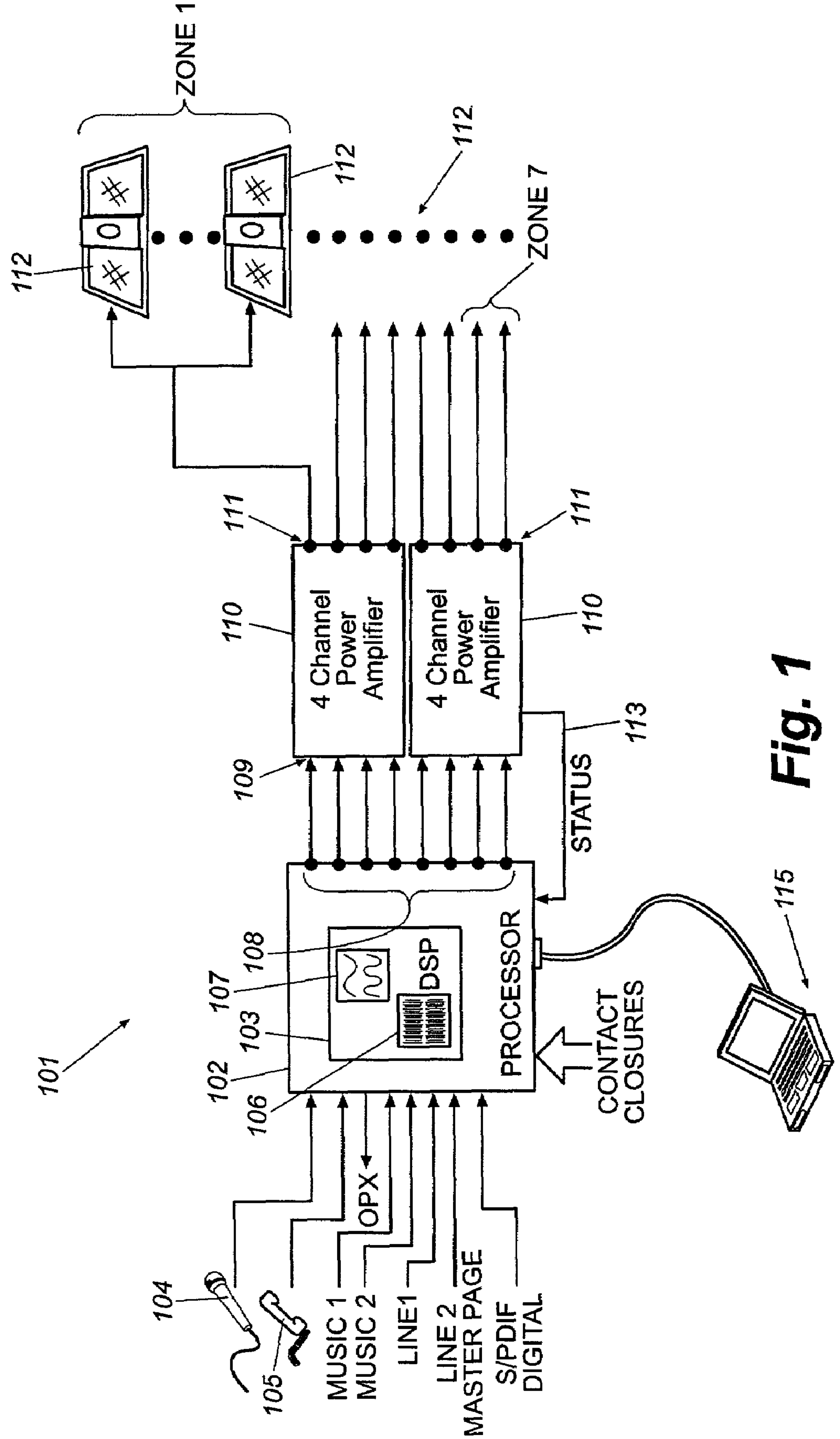
FIG. 1 is a block diagram showing key components of a sound distribution system that embodies principles of the invention in a preferred form.

Reference will now be had to the drawings, which illustrate in more detail a preferred system and implementation of the present invention that represent the best mode known to the inventors of carrying out the invention. FIG. 1 illustrates a preferred configuration of hardware comprising the system of the invention. The system 101 comprises a processor 102, which includes a DSP chip 103. The processor has a plurality of inputs to accommodate a microphone 104, to be used for paging, a telephone device 105, music 1 and music 2 inputs, line 1 and line 2 inputs, and a stereo S/PDIF digital audio input. The line 2 input also may function as a master page input in some configurations of the system, as discussed in more detail below. In addition to the external input signals, masking sound signals 106 and test tone signals 107 are stored and/or generated within the DSP 103. The processor also is provided with an array of contact closures for implementing a variety of system functions, such as, for example, assignment of a page to a particular zone or zones within a facility. A standard communications port, such as a serial port or an RS232 port, is provided for connecting a laptop computer 115 running a graphical user interface (GUI) for changing or adjusting various functions of the DSP, as detailed below. The processor 102 is provided with eight outputs 108 for delivering eight channels of audio signal to the eight inputs 109 of a pair of four channel power amplifiers 110. The power amplifiers 110, in turn, have a total of eight outputs for driving flat panel sound radiators 112 located in up to eight zones of a space in which the system is installed. In this regard, a zone may contain any number of flat panel radiators depending on the size of the zone. In addition, as indicated at zone 7, radiators in a single zone may be driven by two channels, in which case the channels may be linked within the system, as detailed below. In the preferred embodiment, the outputs of the processor and the inputs of the power amplifiers are digital and the power amplifiers provide a status signal 113 back to the processor for internal status monitoring of the components of the system. While the particular hardware configuration of FIG. 1 is preferred, other configurations also are possible and are within the scope of the present invention.

It will be understood by those of skill in the art that the audio signal processing methodologies illustrated in FIG. 1, many of which embody principles of the present invention, are implemented through software in the digital signal processor (DSP) chip, which may, for example, be a DSP56364 chip, available from the Motorola Corporation of Austin, Tex. Such chips, their associated support electronics, and their use in general are well known by those of skill in the art of digital audio signal processing. Accordingly, these electronic components and their configurations need not be described in great detail here. In general, however, and as discussed briefly above, the hardware in which the functionality of the present invention is embodied preferably includes an array of high quality flat panel sound radiators, such as those disclosed in the above incorporated U.S. patent applications. These flat panel radiators, which can produce high fidelity sound that is diffuse and generally non-directional, and whose acoustic response characteristics are well known, are installed within the suspended ceiling system of a large space such as an office complex and may be segregated in up to eight zones within the space. Generally, the designations and identification of these zones for purposes of the present invention are determined by the sound system designer and architects of the space before the system is installed. By way of general example, however, one zone may be designated to be within an open plan office cubical area containing several offices separated by cubical partitions. Another zone may be designated as comprising closed plan offices along a hallway while yet another may b e within a large conference room, and another in a client waiting area, and so on.

Each of the illustrated and other types of zones generally are characterized by the fact that they have different audio requirements. For example, a zone comprising open plan office cubicles likely will require efficient and effective masking sound to mask distracting noises such as human conversation from adjacent cubicles to enhance productivity of the workforce. On the other hand, it may be desirable to have no masking sound and only background music in zones such as client waiting areas. Paging, as well, generally is required only in certain areas, and these areas may differ for different types of pages. These factors and others all are taken into account by the sound system designer and architect when establishing the sound distribution zones of a space within which the present invention will be implemented.

Also as mentioned above, the flat panel radiators of the installed array are driven, in the embodiment of FIG. 1, by a pair of 4 channel power amplifiers, for a total of 8 channels for driving flat panel radiators within up to 8 zones of the space. Preferably, the audio signals are distributed to the flat panel radiators as standard 25, 70, or 100 volt audio signals to avoid impedance matching issues, and each panel has an appropriate matching transformer. Alternatively, the flat panel radiators could have a standard 8 ohm impedance and be driven directly by the amplifiers without a matching transformer. In any event, the eight inputs of the power amplifiers, which may be analog inputs or, preferably, digital inputs, receive their respective audio program signals from the eight outputs of a digital audio signal processor, within which, as mentioned above, the methodology of the present invention is implemented in a DSP. In the preferred embodiment, the processor has audio inputs for receiving source signals from a paging microphone, a dialed-in telephone, two IHF signal level music sources, and two line level (or digital) audio sources. Audio signals present at these inputs are processed and routed by the processor according to the methodologies of the present invention before being delivered to selected ones of the eight processor outputs, as designated by the user and as described in more detail below.

Figure 2A:
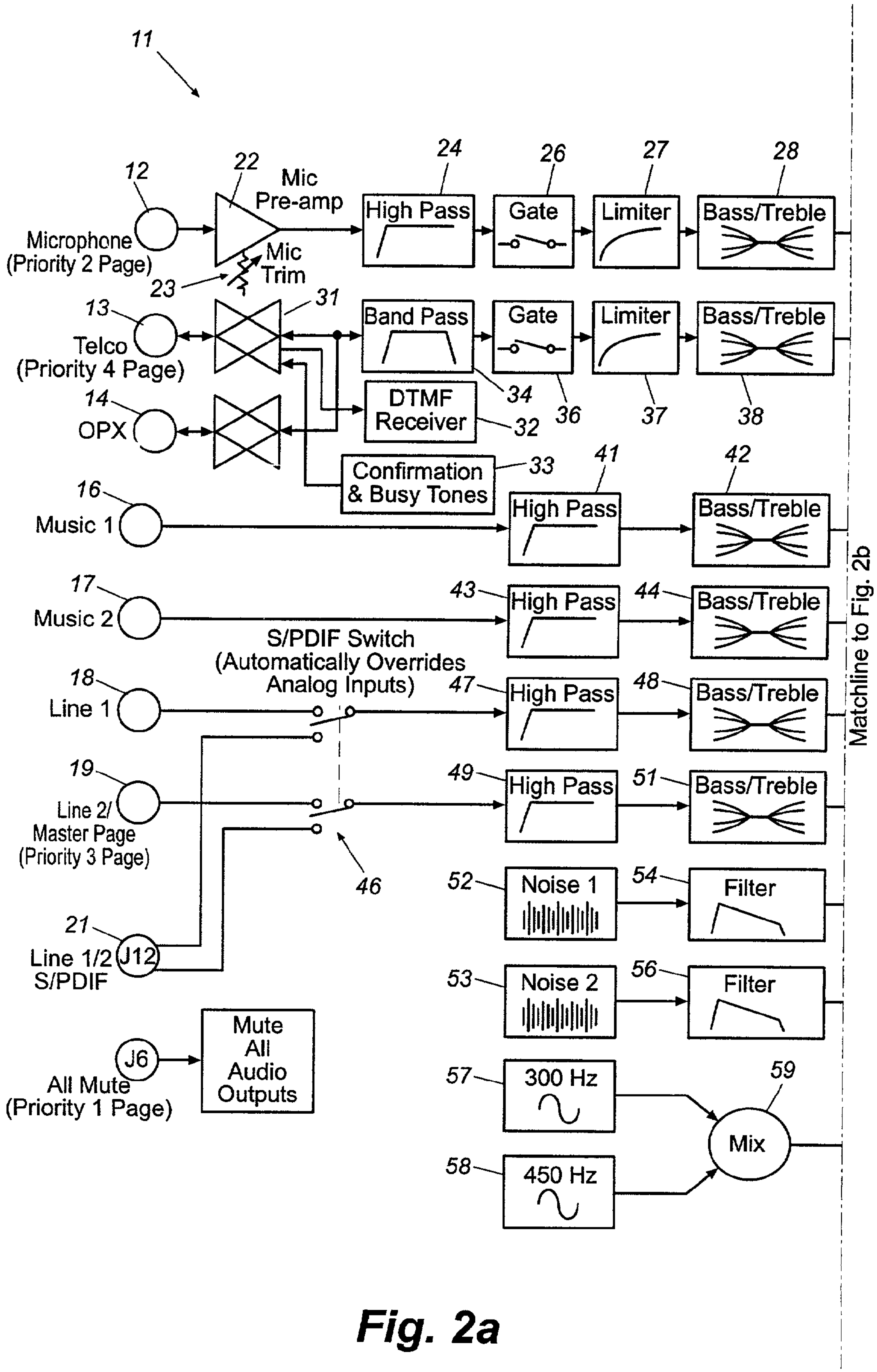
FIG. 2 is a functional flow diagram illustrating the methodology and functions of the present invention implemented in an eight channel architectural sound enhancement system.
Figure 2B:
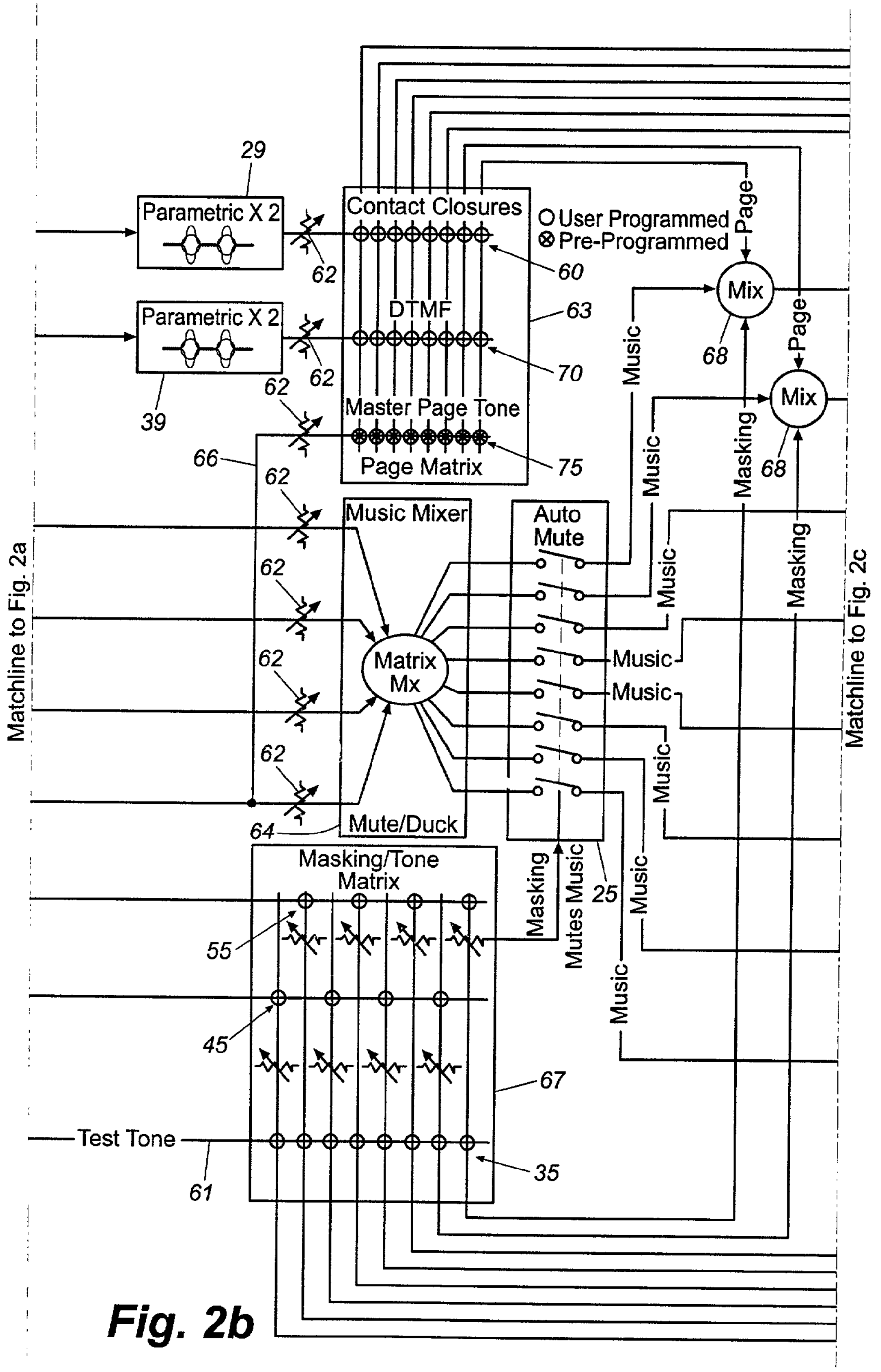
Figure 2C:
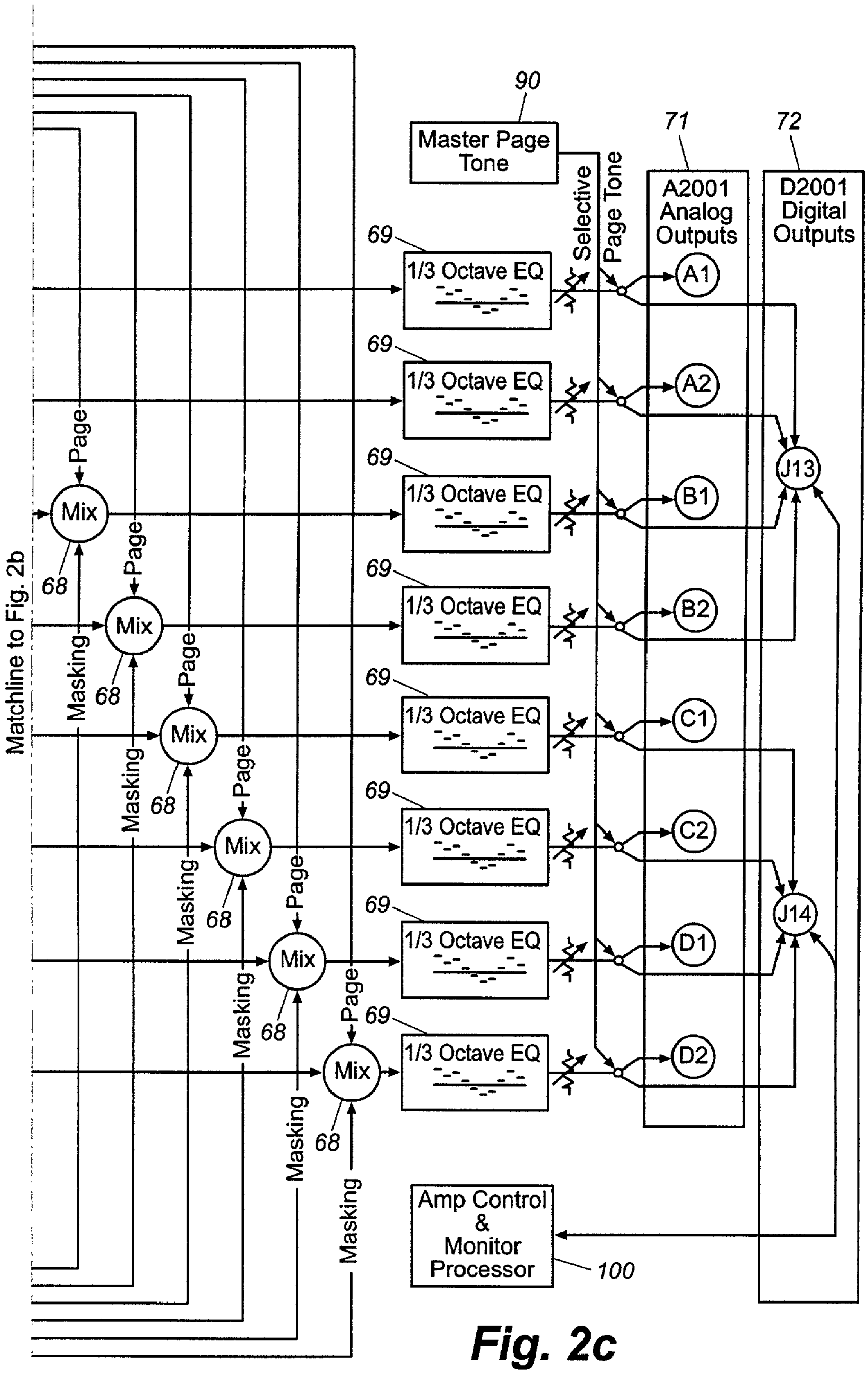

With the forgoing brief description of the hardware configuration for supporting and carrying out the methodology of the present invention, the invention will now be disclosed and described in detail with reference to FIG. 2. As mentioned above, FIG. 2 illustrates signal routing and processing functions that embody unique features of the present invention and are implemented through software within the internal DSP of the processor. Preferably, the various processing functions that embody the invention are accessed and user implemented and manipulated by means of a graphical user interface (GUI) implemented on a laptop or other computer coupled to the processor through its communication port. Each user controllable function or processing stage illustrated in FIG. 2 has a corresponding window within the GUI. These windows may take the form of virtual audio faders, option selection boxes, or routing designation matrices depending upon the function or processing stage being accessed. Use of the various windows of the GUI and use of the GUI in general will be referred to below where appropriate and helpful to a complete understanding of the methodology of the invention.

Each audio input to the processor will be described in turn, along with "front-end" digital signal processing such as equalization (EQ), limiting, gating, filtering, and the like effecting signals present at each input. The routing of these various effected signals will then be traced through the "back-end" of the processor to the analog or digital outputs as the case may be. Referring now with specificity to FIG. 2, the digital signal processing functions 11 implemented primarily within the DSP are illustrated. Audio input 12 is configured to receive microphone (mic) level input signals from a microphone to be used for paging announcements. A microphone signal present at input 12 is first pre-amplified to a line level signal (−10 dB to 4 dB) by means of an analog mic preamplifier 22. A mic trim potentiometer 23 controls the gain of the preamplifier and preferably is accessibly located on the chassis of the processor to be user adjusted for a particular microphone such that an optimum signal-to-noise ratio is achieved at the output of the pre-amp 22. The pre-amplified and trimmed mic signal is then subjected to a high pass filter 24, which preferably, but not necessarily, has a 24 dB per octave roll off at frequencies below about 80 Hz. The high pass filter 22 helps to remove rumble, boominess, plosives, and other unwanted low frequency components of the raw signal from the microphone without affecting the content of human speech, which generally has a frequency range above 80 Hz. In addition, application of the filter 22 removes the lower frequency portions of the signal that impose high power demands on the power amplifiers. The filter 22 thus helps to preserve headroom within the power amps and also reduces the total power delivered to the flat panel sound radiators.

The filtered mic signal is next subjected to a gate 26, where it is inaudibly gated to prevent the passage of low level microphone line and background noise when speech is not present. When speech is present, the gate is opened and the signal is subjected to a limiter 27, which limits the maximum level of the signal to a specified ceiling to prevent internal digital clipping. The limiter 27 preferably, but not necessarily, is a soft-knee limiter to provide level protection that is subtle and natural sounding when operating on signals representing the human voice. From the limiter 27, the signal is routed to a Baxandall-type bass and treble tone control 28, which provides level enhancement or adjustment at selected low and high (bass and treble) frequencies. Unlike the high pass filter 24, gate 26 and limiter 27, the bass and treble controls 28 are user adjustable via virtual level faders accessible in the GUI. Preferably, but not necessarily, the signal may be increased or decreased by 14 dB at both the bass and treble adjustment frequencies.

Since the human voice is complex and varies from person to person and because the response characteristics of various microphones that may be used with the system varies, a two band parametric EQ 29 also is provided to allow fine and targeted equalization of the microphone signal to produce high quality pages that sound natural and cut through background and ambient noise within a space to be easily heard and understood. The parametric EQ also is user accessible through virtual faders within the GUI. A user may adjust the center frequency, the Q or width of the frequency band to be adjusted, and the level of increase or decrease to apply for each of the two adjustable frequency bands. Of course, other types of equalization such as, for example, graphic EQ, may be selected, but, in any event, it has been found that a relatively sophisticated level of available EQ adjustment is desirable for the paging microphone to assure optimum audio performance. From the parametric EQ 29, the microphone signal is routed to the page matrix 63, to be discussed in more detail below.

The next input to the processor is the telephone company or Telco input 13. The Telco input is provided to allow paging announcements to be relayed to the system from a telephone as an alternative to the use of a microphone coupled to mic input 12. The Telco input also receives and decodes Dual Tone Multi Frequency (DTMF) sounds or "touch tones" from a telephone keypad for control of certain functions of the system, as described in more detail below. The Telco input 13 is configured to connect to the Public Switched Telephone Network (PSTN) and/or to accept dry loop phone service from a Public Exchange (PBX), KTS, CENTREX, or virtually any type of telephone interface device (including cell and mobile phones via the PSTN). In essence, a telephone connection may be made at the Telco port and the system can be accessed from a telephone, which may be locally or remotely located, by dialing the telephone extension assigned to the processor. In this regard, a DTMF receiver and decoder 32 and a confirmation and busy tone generator 33 are provided to interface appropriately with an incoming call.

The telephone audio signal passes from the Telco input 13 through a two-way or "hybrid" 31 within the processor. The DTMF receiver 32 is coupled to the hybrid 31 and listens for DTMF tones present on the telephone connection. Similarly, the confirmation and busy tone generator 33 is coupled to the hybrid and is configured to deliver either a confirmation tone to the calling telephone confirming that successful connection has been made or a busy tone indicating to the calling telephone that telephone access to the system currently is unavailable. Thus, the system interfaces with an incoming call using standard telephone protocols. An Off Premises Exchange (OPX) output port is provided to drive a downstream Telco port, if any, of another processor that is configured as an expansion processor in systems where multiple processors are chained together in large or multi-building facilities, which, of course, provides additional channels and outputs to service zones in addition to the 8 zones serviced by the master processor. In this way, all processors in a multiprocessor system can be accessed from a telephone.

When a telephone is to be used as paging microphone, the audio signal representing the voice of the person on the phone (i.e. the telephone audio) is processed in much the same manner as the audio signal from a microphone, discussed above. More specifically, the signal is first subjected to a band pass filter 34, which includes low and high frequency roll-offs to remove portions of the audio spectrum outside the range of a human voice on a telephone and, as mentioned above, to preserve power amp headroom and reduce total power delivered to the flat panel radiators. The signal is then inaudibly gated by a gate 36 to prevent transmission of background and line noise on the phone when a caller is not speaking, and subjected to a soft-knee limiter 27 to prevent digital clipping while preserving a natural sounding voice signal. Just as with the microphone signal, extensive EQ capability is provided for a telephone page in order to tune the signal to produce the most natural sounding and effective pages when reproduced by the flat panel radiators of the system in the various zones. Specifically, a Baxandall-type bass and treble control 38 followed by a two-band parametric EQ 39 is provided for maximum control of the frequency spectrum of the telephone audio signal. As with the microphone EQ controls, these EQ controls are user accessible and may be adjusted by a system installer or user by means of virtual faders available in the GUI.

In addition to receiving telephone audio for paging purposes, the Telco input also may receive DTMF signals that can be used to increase or decrease the sound level in any of the designated zones of a space serviced by the system. This is a useful function and feature of the system in situations, for example, where the initial level settings for a zone or zones need to be changed and a technician is not locally available to make the adjustments with a GUI connection. In such situations, a technician in a remote location may call the system and make the adjustments with DTMF signals entered on the telephone keypad while a live person standing within the zone being adjusted communicates by telephone with the technician to inform him when the level setting is appropriate. Alternatively, a local system administrator may dial the processor on a cell or other phone and select zones that need adjusting. The administrator then may move to the selected zones and adjust the volume within the zone using the telephone keypad until the sound level is appropriate. Thus, the telco input provides for both a local "remote controller" of the system and a means by which the system volume may be adjusted from a remote location if necessary.

In the preferred embodiment, this telco function is implemented in the DSP as follows, although various other implementations are possible all within the scope of the invention. When a telephone connection is established with the system, a valid multiple digit DTMF zone address is dialed to place the processor in the page mode and to select the zone corresponding to the dialed address. A special DTMF code (*5555 in the preferred embodiment) is then dialed by the caller to place the processor in the remote volume control mode. A DTMF code is then input to select a processor output (1-8 for Example) whose volume is to be adjusted. This is the output that drives the flat panel radiators within the zone where level is to be adjusted. (In some cases, a zone may be driven by two outputs, as discussed in more detail below. In these cases, the level of both outputs driving the zone should be adjusted.) The caller then may press a designated digit ("4" in the preferred embodiment) to lower the volume level incrementally in the selected zone or another designated digit ("6" in the preferred embodiment) to raise the level incrementally within the zone. When the volume level is correct within the zone, the telephone call to the system may be terminated. In FIG. 1, the DTMF level control commands affect the eight level controllers 76 at each of the eight outputs of the processor.

The next two inputs to the processor are the music 1 and music 2 inputs 16 and 17 respectively, which are intended to receive background music signals for routing to one or more zones, such as, for example, client waiting rooms, within the space. These inputs each are monophonic and configured to accept IHF signal levels (−14 dBu operating levels), which are typical of consumer audio electronic devices such as CD players and the like. Thus, two different background music programs may be connected to the processor and each program can be routed to selected zones within the space, as described in more detail below. The signal at the music 1 input 16 is first subjected to a high-pass filter 41 to remove unwanted low frequency components such as rumble, to preserve amplifier headroom, and to reduce the power levels ultimately delivered to the flat panel sound radiators, and then passed through a Baxandall-type bass and treble tone control 42 for tone adjustment. The tone control 42 is user accessible and can be adjusted by means of virtual faders in the GUI when a control computer is coupled to the processor. Since music sources generally are much more consistent than the human voice and generally are pre-limited and pre-mastered for optimum sound quality, the gates, limiters, and parametric EQ provided for pre-processing microphone and telephone signals are not necessary and are not provided for music signals present at the music inputs 16 and 17. The pre-processing of a music signal present at the music 2 input 17 is identical to that just described with respect to the music 1 input 16. Once filtered and tone adjusted, music signals, if any, from inputs 16 and 17 are routed to the music mixer 64, whose functions are described in more detail below.

Line 1 and line 2 inputs 18 and 19 respectively also are provided for receiving line level (0 dBu) signals typical in professional audio playback devices. These inputs may be used, for example, when deriving background music from a professional grade CD or tape player or radio tuner, from a subscription or satellite music provider, or from any device with higher level professional outputs. The pre-processing of line level signals at inputs 17 and 18 is similar to that for music inputs 16 and 17 and thus need not be described in great detail. Generally, however, line level signals are subjected to high-pass filters 47 and 49 respectively for limiting power to the radiators and removing unwanted low frequency rumble, and then to GUI accessible and adjustable bass and treble controls 48 and 51 respectively. Again, since line level sources generally are of higher and more consistent quality that microphone or telephone signals, no additional processing or EQ is needed or required. As with signals at the music inputs, processed signals from the line inputs are routed to the music mixer 64.

Line 2 input 19 also serves as a master page input when the processor is configured as an "expansion" processor and driven by an output of a "master" processor. For this purpose, pre-processed signals from the line 2 input 19 are tapped at 65 and routed via signal path 66 to page matrix 63. Implementation of the master page function is described in more detail below.

The final external audio signal input is the Sony/Phillips Digital Interface (S/PDIF) digital input 21. This input is provided to receive digital audio signals from commercial or professional audio equipment such as CD players and the like, many of which are provided with digital audio outputs. S/PDIF switches 46 are provided and these switches automatically mute the analog line 1 and line 2 inputs 18 and 19 whenever a valid digital audio signal is present at the digital audio input 21. Thus, digital audio inputs automatically take precedent over analog line level inputs. The S/PDIF input is a stereo or two channel (each channel may carry a different digital audio program) input, thereby receiving signals corresponding both to the line 1 and line 2 analog inputs 18 and 19.

In addition to the external inputs described above, internal audio sources for masking sound and test tone use also are provided according to the methodology of the present invention. For producing masking sounds within selected zones of a space, two uncorrelated masking noise sources 52 and 53 are provided in the processor. Each source may be a digital audio file stored in the processor and may represent standard white noise, but most preferably represents pink noise to avoid the perceived high frequency level increase inherent in white noise. As an alternative to a stored digital audio file, the masking noise may be generated "on-the-fly" in the DSP by a variety of techniques, including the use of regenerative digital delay lines with strategically located feedback tap locations. In the illustrated embodiment, the stored digital audio files contain about 6 minutes of masking noise each and are uncorrelated, meaning that the noise produced by each source is not aligned or synchronized with the noise produced by the other source. The absence of correlation between the two masking noise files may be accomplished in various ways, including assuring that each file is a separately produced random noise file. In the preferred embodiment, however, the files are decorrelated by virtue of the fact that they start playing at different times and therefore are shifted in time with respect to each other. After playing through, each masking noise file repeats, thereby providing a constant pink noise source for use in masking.

The pink noise from noise source 52 is subjected to a pre-filter 54 and the pink noise from noise source 53 is subjected to a pre-filter 56. Each of the pre-filters 54 and 56 uniquely has a predetermined spectrum that is substantially the same as the desired spectrum of masking sound ultimately to be generated within the space. Further, this relationship between pre-filter spectrum and desired masking sound spectrum is consistent from installation to installation. In other words, application of a given pre-filter predictably produces substantially the same masking sound spectrum within a space, regardless of the nature of the space or the condition of the plenum above its suspended ceiling. This is possible primarily because the flat panel sound radiators of the present invention project highly dispersed and non-localized masking sound directly into the space itself rather than into the plenum above the suspended ceiling. Accordingly, unlike prior art systems, the necessary filtering and tedious equalizing of the raw masking noise to compensate for the character and content of the plenum and the nature of the ceiling tiles is completely eliminated. Thus, a standard pre-filter or set of pre-filters can be established in advance and stored in the processor with confidence that a given pre-filter will result in a predictable and consistent masking sound spectrum in any space. For the first time, then, it is possible to establish precisely tailored pre-filters that are applied to the masking noise signals to produce highly predictable and consistent masking sound fields within any space in which the masking sound system is installed. This simply is not possible with prior art plenum mounted systems.

Standardized and installation independent pre-filtering may be applied according to the invention to produce a masking sound field within a space having virtually any desired spectrum. For example, pre-filtering pink or white noise with an NC40 spectrum may be used to produce an NC40 masking sound field within the space. However, while the NC40 spectrum has been the standard target for masking sound for some time, the inventors have discovered that it results in masking sound with a variety of negative aspects. It was discovered, for example, that the shape of the NC40 spectrum produces a masking sound that is perceived by the human ear as being a bit "hissy" and a bit "rumbly." The inventors have characterized this sound as having a relatively high annoyance factor because it is more perceptible to employees in a workspace and can itself even be distracting and annoying under some circumstances. It also was discovered that a relatively high dB level of the NC40 masking sound was required to mask human speech adequately in a space. It is believed that this results from the poor match of the NC40 frequency spectrum with the frequency spectrum of human speech. Thus, in order to mask all human speech frequencies adequately, the overall level of the NC40 masking sound must be raised until the poorest matched frequencies of the speech are properly masked. Unfortunately, this results in overmasking at other frequencies, and thus the higher required overall dB level. The relatively higher dB level not only renders the masking sound more annoying, it also requires more power from the power amplifiers, thus reducing headroom available for paging announcements and other sounds. It will thus be seen that the traditional NC40 filter curve falls short of an optimum curve for use with masking sound.

Through substantial experimentation, the inventors discovered a unique new masking sound spectrum and corresponding pre-filter curve that improves greatly over the NC40 spectrum. This new spectrum, dubbed by the inventors as an "equal annoyance" spectrum, is characterized by a substantially constant negative slope within the frequency range of the human voice, which is from about 200 Hz to about 5000 Hz. Below 200 Hz and above 5000 Hz, the spectrum falls off steeply such as, for example, by 12 dB per octave. The slope of the spectrum curve between 200 and 5000 Hz may be between about −2 dB per octave and −6 dB per octave. The inventors discovered that a slope within this range of about −4 dB per octave follows the spectrum of human speech much more closely that an NC40 curve. As a result, the overall dB level of masking sound required to produce adequate masking of human speech is reduced and the annoyance of the masking sound itself is significantly reduced relative to that of an NC40 filtered masking sound. Furthermore, masking sound having the unique frequency spectrum of the present invention, it was discovered, is perceived by those within a space as being less annoying, more pleasing, less detectable, and more neutral sounding than NC40 filtered masking sound. This is due in part to the reduced overall dB level of the masking sound and in part to the elimination of the rumbly and hissy sound characteristics of NC40 filtered masking sounds.

The inventors have discovered that subjecting the raw masking noise source to an input pre-filter having a spectrum that is a close match to the desired spectrum of masking sound to be produced in a space has 2 specific advantages. First, since this masking system is based on the use of direct radiation flat panel sound radiators, it is possible to tune the room masking sound to this input pre-filtered spectrum and in doing so the speakers and room will have been equalized. In other words, a pre-established pre-filter is applicable to all installations and all regions within a single installation. The tuning process thus is exceedingly easier than having to take into account the ceiling tile and plenum effects as must be done for the traditional in-plenum masking sound system. Secondly, since the masking speaker is the same speaker used to provide paging (traditional method uses 2 different speakers and electronics) then it is possible to mix paging directly onto the masking signal since the system frequency response is already equalized as above.

The inventors have further discovered that subjecting the raw masking noise to a filter with a substantially constant negative slope, preferably, but not necessarily, having a slope of −4 dB per octave, results in a masking sound that is more efficient at masking human speech, more neutral sounding, less annoying, less perceptible, and that provides a given level of masking at a lower dB level than is achievable with prior art NC40 filter curves. Although preferable cutoff frequencies and filter curve slopes have been identified in the forgoing discussion, it will be understood that these preferred values are not limiting and that values other than the preferred values may well be selected by those of skill in the art, all within the scope of the invention. Furthermore, the slope of the curve within the frequencies of interest need not be perfectly constant, but might be varied by those of skill in the art to meet application specific demands, again, all within the scope of the invention. In fact, a wide range of pre-filter spectra may be selected within the scope of the invention depending upon application specific requirements.

The generation of the uniquely pre-filtered masking sound signal has been described above as a multi-step process wherein a base noise, such as pink noise, is generated and then subjected to a pre-filter with the desired curve. As an alternative to this approach, the masking sound signal can be created in the DSP in a single process, which is more computationally efficient than a two step process. Several methods of accomplishing this are available and generally known to DSP programmers. For example, the implementation of a regenerative digital shift register with carefully selected feedback taps that are fed back to the beginning of the register is sometimes used to generate white or pink noise "on-the-fly." With a long enough delay line and carefully selected numbers and locations of the feedback taps, a masking noise signal with a spectrum that closely approximates that of a given pre-filter curve can be generated straight out of the delay line and without computationally intensive filters that operate on a pre-existing white or pink noise. Other techniques also may be used. Regardless of the process of generating the masking sound signal, it is the characteristics of the masking sound spectrum and the overall concept of pre-filtering a masking signal using a pre-established filter spectrum that is the same as the desired spectrum of masking sound to be produced in the space that forms the basis of the corresponding invention.

The uniquely pre-filtered masking sound of the present invention is routed from the filters 54 and 56 to the masking/test tone matrix 67, which is discussed in more detail below. It will be noted, however, that the masking sound from the first noise source 52 is applied only to processor outputs A1, B1, C1, and D1 whereas masking sound form the second uncorrelated noise source 53 is applied only to processor outputs A2, B2, C2, and D2. This routing scheme accommodates masking sound zones within a space wherein two outputs (say A1 and A2) are linked to drive two sets of flat panel radiators within the same zone. In such an arrangement, the uncorrelated masking noises routed to the two linked outputs eliminates constructive and destructive interference of the masking sounds within the zone and thus eliminates the resulting perceived level changes that might otherwise be detectable where correlated noise sources are used.

The second sound sources produced internally within the processor are diagnostic test tones 57 and 58. These tones also may be stored digital audio files or may be produced real time by oscillators available in the DSP. In the preferred embodiment, the first test tone 57 is a 300 Hz sine wave and the second test tone 58 is a 450 Hz sine wave. Other frequencies and other types of sound curves may be selected by those of skill in the art. However, the illustrated tones are preferred. They are at relatively low frequencies to allow the ear to be operating in a frequency range where its spatialization is acute (in other words it is easy to pinpoint the location of sounds at these frequencies) but are above lower frequencies where room-modes readily set up standing-waves, distributing the apparent source of the sonic energy away from its actual source. The frequencies of the test tones also are below the ear-separation frequency, above which the ears are dependent on amplitude differentials and not phase differentials. There are two tones in the preferred embodiment so that any standing-wave pattern developed in the listening space that may negatively impact localization of one tone will be unlikely to occur at the frequency of the second tone as well. Finally, unlike telephone touch tone sounds, the frequencies of the two tones are at a musical interval with respect to each other to sound pleasant to the ear.

The test tones 57 and 58 are mixed together at mixer node 59 to produce a bi-tone test signal to be used in novel ways to test for correct connections and proper operation of a sound enhancement system embodying this invention, as described in more detail below. During system testing using the bi-tone test signal, the test signal is routed in various ways to the outputs of the processor for testing connections to the flat panel radiator arrays of the system. This signal can be used, for example, to determine if the specified speakers are indeed properly wired into the designated sound channels, that the transformer tap for each panel is indeed set to the proper setting, and that the speaker is working properly (no voice coil scratch, etc.) The unique and distinguishable sound of the test signal makes it easy to hear and more importantly easy to localize when listening to responses of the flat panel radiators to the test signal. The ability to localize the test tone is particularly useful since the flat panel sound radiators are virtually indistinguishable from the surrounding regular ceiling tiles.

With the processor inputs and internal sound sources described, discussion now will focus on the signal routing functions embodied in the page matrix 63, the music mixer 64, and the masking/test tone matrix 67.

The page matrix 63 receives pre-filtered and processed signals from the microphone input 12 and the telco input 13 and routes these signals to the processor outputs according to user defined routing schemes. More specifically, microphone paging signals are selectively coupled to each of the processor's eight outputs at crosspoints 60 within the page matrix 63. At each crosspoint, the signal can be coupled to or disconnected from the corresponding output line for selectively applying the microphone paging signals to any combination of the eight processor outputs. Crosspoint functions are user accessible through the GUI such that a user may program which outputs and thus which zones within the space are to receive microphone paging announcements. Furthermore, the processor is programmed to allow for up to six different paging-to-output assignment configurations for maximum paging flexibility. The paging assignment that is activated for any given page is selected through six contact closures provided on the processor chassis. For example, it may be determined that certain types of pages need only be delivered within a zone where staff members work in an open plan architecture, other types should be delivered only in executive office zones, and other types need only be delivered in client waiting room zones. Such a paging scheme is easily set up through an attached GUI by clicking on the zone or combination of zones that are to be active for each of the six different page assignment configurations. Switches connected to the six contact closures can then be provided at the location of the microphone so that a paging clerk can select the appropriate paging configuration for each page to be made. Each crosspoint of the page matrix also includes a level control for setting the level or volume of a page delivered to any of the eight processor outputs. These level controls are user accessible and the levels are set by manipulation of virtual faders that may be selected with the GUI.

Telco paging signals received from a remote telephone at telco input 13 also are selectively coupled to each of the processor's eight outputs at crosspoints 70 within the page matrix 63. At each crosspoint, the signal can be coupled to or disconnected from the corresponding output line for selectively applying the microphone paging signals to any combination of the eight processor outputs. Just as with crosspoints 60 for microphone paging signals, crosspoint functions for telco pages also are user accessible through the GUI such that a user may program which outputs and thus which zones within the space are to receive telco paging announcements.

The system also allows for several telco paging zone assignment configurations, just as it allows for up to six microphone paging zone assignment configurations. In the case of telco zone assignments, however, the selection of a particular zone assignment at the time of a page is accomplished by dialing a pre-assigned DTMF code that corresponds to the desired assignment configuration on the remote telephone keypad. The zone assignment configurations and their corresponding DTMF codes are user definable through the GUI. For example, in the appropriate GUI window, the user may identify DTMF code "1" as corresponding to a page in the open plan staff zone of the space by clicking in the window only the processor outputs that feed this zone. Similarly, DTMF code "2" may be identified as corresponding to a page in all zones except the client waiting area zones, and so on. In operation, when a page is called in from a remote telephone, the caller inputs the DTMF code of the zone assignment configuration corresponding to the zones within the space where the page is to be delivered. Thus, it will be seen that telco pages enjoy the same flexibility as on-site microphone pages. As with microphone crosspoints 60, level controls, adjusted through virtual faders in the appropriate GUI window, are provided at each of the crosspoints 70 for adjusting the level or volume of a telco page for any of the eight processor outputs. Accordingly, the telco page feature of this invention provides for greatly expanded paging capabilities since a page can be delivered to selected zones of the space from any telephone virtually anywhere in the world.

The processed signal from the line 2 input 19 is tapped at 65 and routed via signal path 66 to the page matrix, where it is coupled to the eight processor outputs at crosspoints 80. This feature of the system is active only for an expansion processor that receives a master paging input from a master processor through one of the master processor's outputs. For example, one of a master processors outputs may be assigned to feed a zone in a building complex, such as a cafeteria, that is remote from the main building in which the master processor is located. In such a case, a second processor, configured in the GUI as an expansion processor, receives signals from the assigned output of the master processor through a twisted pair of wires extending through an underground or other service conduit and connected to the line 2/master page input of the expansion processor.

When it is desired that a page from the main building be directed to the expansion processor for delivery in the cafeteria in this example, then the master page tone generator 90 generates an inaudible audio signal, which is a sine wave at 18 kHz in the preferred embodiment. This signal is routed to the output of the master processor assigned to the cafeteria and coupled to the expansion processor in that building. Upon receiving the master page tone at its line 2/master page input, the expansion processor recognizes the tone and switches to its page mode. Any music (but not masking) sounds present in or routed to the expansion processor are muted and or/ducked by installer choice. The master page audio signal is then transmitted over the same twisted pair as the master tone signal to the expansion processor, where it is received at the line 2/master page input 19 of the expansion processor and routed via signal path 66 to the page matrix. Thus, the same twisted pair of wires is used both to place the expansion processor in its page mode and to deliver the page audio, thereby eliminating the need for a separate pair of wires for controlling the expansion processor.

In the page matrix of the expansion processor, the master page audio signal is coupled to all eight of the expansion processor's outputs at crosspoints 75. In the preferred embodiment, a master page is pre-configured to be routed to all outputs of the expansion processor and is not user programmable. However, the crosspoints 75 may, if desired, be configured as user programmable crosspoints within the scope of the invention since the functions of this invention are implemented in software within each processor's DSP. The master page is thus delivered to the flat panel radiators within the cafeteria along with the designated zones, if any, in the main building.

When the master page is terminated, the master page tone generator 90 discontinues the master page tone and the expansion processor reverts back to its normal operating mode wherein masking sounds and/or background music (the background music may be received from the master processor through the line 2 input) is played in the remote building. This method of controlling and delivering page audio signals to the expansion processor over a single twisted pair of wires is unique and provides a level of functionality heretofore unknown in the art of sound distribution systems.

It will be seen that one or more expansion processors may be used to expand the sound distribution system of this invention beyond the 8 channels provided for in a single processor and power amp system. Each expansion processor provides 8 additional channels to feed sound radiators in up to 8 additional zones. These zones may be in a separate or remote building as described in the above example, or, alternatively, they may be in the same structure in situations where more than 8 zones of sound distribution is required. In either event, provisions for master and expansion processor chaining in the present invention expands substantially the application and usefulness of the sound distribution system of the invention.

The music mixer function 64 receives processed audio signals from music and line inputs 16, 17, 18, and/or 19 for routing to the outputs of the processor assigned to zones, such as a client waiting room, within which background music is to be played. A mixer is provided in the music mixer module that allows a system installer or user to set an individual mix of these input sources for each of the eight outputs of the processor. This mixer function is accessed through the GUI and the level of each input signal that is delivered to each of the processor's outputs is adjustable by means of virtual faders in the appropriate window of the GUI. For a pair of processor outputs that are linked and feed a single zone, such as an open plan space, the mixer function also is linked so that level settings affect each of the linked outputs equally. For example, suppose that outputs A1 and A2 are linked and service the cafeteria of an office space and that output B1 feeds the client waiting room of the space. It is desired that up-tempo background music be played in the cafeteria while soothing classical music be played in the client waiting room. In this situation, an up-tempo music program might be coupled to the music 1 input 16 while a classical music program might be coupled to the line 1 input 18. To obtain the desired result, a user or installer accesses the music mixer window in the GUI and raises the music 1 input fader for linked outputs A1 and A2 to the appropriate volume level and lowers the faders for music 2, line 1, and line 2 to their off position. Thus, up-tempo music from the music 1 input is routed to linked outputs A1 and A2 and played in the cafeteria. Output B1 is then selected in the GUI and the virtual fader for the line 1 input is raised to the appropriate level for the waiting room and the faders for the other inputs are lowered to their off positions. Thus, soothing classical music from the line 1 input source is routed to output B1 and played in the client waiting room. Many other permutations of this example clearly are possible and this immense flexibility is an integral part of the uniqueness of the present invention.

Another function embodied in the music mixer 64 is the mute/duck function, which is user accessible through the GUI. When a page is delivered to a zone designated for background music, it is desirable that the music be reduced in volume or muted during the page so that the page can be heard clearly. To accommodate this functionality, a user may access the mute/duck window in the GUI and may select, by clicking the appropriate selection, whether the music is to be muted (i.e. completely silenced) during a page or ducked (i.e. reduced in volume). If it is desired that the music be ducked during a page, the user has the option of selecting whether the music is to be reduced by 12 dB or 20 dB. Thus, a system administrator or installer may determine whether background music is muted or ducked during a page and, if it is to be ducked, how much level reduction should be applied. The installer also has a choice of whether to apply attack and/or decay of the muting or ducking prior to and after the page, and the fall/rise time of the attack and delay can be set in 1 millisecond increments up to 2 seconds in duration using the GUI.

The masking/test tone matrix receives and routes the internally generated masking sounds and bi-tone test tone, which is used for system diagnostics as detailed below. More specifically, masking sound from the first masking noise source 52 is coupled at crosspoints 55 to processor outputs A1, B1, C1, and D1 while masking sound from the second masking noise source 53 is coupled at crosspoints 45 to processor outputs A2, B2, C2, and D2. As mentioned above, the routing of the two uncorrelated masking sounds to adjacent outputs accommodates system configurations where two outputs, say A1 and A2, are linked to provide masking sound a single zone. The uncorrelated masking sounds played in such a zone does not produce interference effects and therefore produces a masking sound within the zone that is uniform, consistent, and non-distracting.

Each of the crosspoints 55 and 45 are user programmable through the GUI. In the appropriate GUI window, a system administrator may select the processor outputs that are to receive masking noise and also may select which outputs are to be linked for multi-channel zones. When an output is selected to receive masking sounds, the auto mute function 25 is activated for the selected output to insure that background music and masking sound are never played simultaneously in a zone. Auto mute is a hardwired function of the system since background music and masking sound played simultaneously is distracting and annoying and should never occur unless specifically desired, in which case a specified masking channel output can be physically routed with a hardwire to one of the line level inputs, e.g. Line 1, such that music and masking can be mixed on the same channel as necessary.

A unique function embodied in the masking/test tone matrix is the paging-over-masking function. This function is user accessible through the GUI and allows the user to select one of three decibel levels by which the level of a page will exceed the level of masking sound in zones receiving masking sound. Since the masking sound (if used on a channel) is the primary signal and the one that is tuned first, it is necessary that adequate headroom in the processor be preserved so that the paging signal can later be mixed onto that same channel while ensuring that the paging (louder signal) not be clipped or overloaded, and that the masking (quieter signal) be optimized to ensure effective masking and optimum amplifier loading. Specifically, in order for individuals to hear a page clearly over masking sounds, the level of the page must be at least 10 dB and more preferably 20 or 30 dB higher than the level of the masking sound. In other words, the signal-to-noise ratio during a page must be at least 10 dB and preferably 20 dB. Further, it is expected and preferred that the overall paging level should always be at least at a raised voice level (65-70 dBA) in any application, and that masking can be anywhere between 40-50 dBA depending on application area. It was discovered, however, that if the level of masking sound is allowed to be set independently of the level of paging announcements in a zone, the masking sound level tends to be set so high that insufficient headroom remains in the power amplifiers for the level of a page to exceed the level of masking sound by the desired dB. To address this problem, the inventors devised the paging-over-masking function of the system. More particularly, the level of masking sounds routed to processor outputs is not independently adjustable. Instead, in the paging-over-masking window of the GUI, a user may select for each masking sound zone a decibel level, either 10 dB, 20 dB, or 30 dB, by which the level of pages are to exceed the level of masking sound within the zone. The system then sets the level of the masking sound such that sufficient headroom remains in the power amplifiers to allow page levels to exceed masking sound levels by the selected dB. Pages are thus always heard clearly over the masking sounds and are always at a raised voice volume level. The paging-over-masking function therefore is a unique solution that insures in all cases the desired signal-to-noise ratio and overall volume during a page so that the page can be heard clearly over masking sound in masking sound zones of a space.

The bi-tone test tone 61 may be selectively coupled to the processor outputs at crosspoints 35 for performing system diagnostics during or after installation or at any time when the system does not seem to be functioning properly. The unique diagnostic function of the system operates as follows. In the test and diagnostics window of the GUI, the status of the power amplifiers, as determined by the amp control and monitor processor 100, and the status of the internal DSP are displayed as an indication that the electronic components and software of the system are operating properly. In addition, an input mute/test tone matrix is displayed in which the user may selectively mute the input to any or all of the 8 processor outputs and may selectively route the bi-tone test tone to any or all of the outputs. This allows the installer or the user or system administrator to troubleshoot and check all of the system wiring and connections that are external to the power amplifiers and the DSP. The test tone diagnostics feature is particularly useful during system installation to confirm proper connections and functionality of all of the external components and wiring of the system.

For example, suppose it is noticed that the flat panel radiators in a particular zone within the workplace, say the zone fed by processor output D1, are not receiving their assigned sounds, i.e. no sounds are being played in that zone. Using the diagnostic function of the system, accessed in the GUI, the installer or system administrator might mute the inputs to processor outputs feeding the affected and nearby zones to provide silence and then route the bi-tone test tone to processor output D1, which feeds the apparently non-functioning zone. If the tone is reproduced by the flat panel radiators in the zone, this might be an indication that the zone set-up and processor output assignments in the GUI has not been performed properly. On the other hand, if the test tone is not reproduced by the flat panel radiators in the zone, this might be an indication that the wiring from the power amplifiers to the flat panel radiators is faulty or improperly installed. If the test tone is reproduced, but at a very low level (or a very high or distorted level), this might indicate that the power amplifier is connected to the wrong transformer taps of the flat panel radiators. If certain radiators produce a sound with, for instance, a voice coil scratch noise, then a faulty radiator might be indicated. And so it goes. It will be clear from this example that multitudes of combinations of muting and test tone routing may be implemented to aid in the diagnosis of virtually any operational anomalies related to wiring and installation of the system or to faulty components. The unique bi-tone test tone diagnostic function in conjunction with the status monitoring of internal electronic components provides an invaluable tool to installers and system administrators for assuring that the system is installed and functioning properly.

Paging signals, music signals, and masking sound signals are routed from their respective matrices to mix nodes 68 and from each mix node to an output equalization (EQ) function 69 for each processor output. Each output EQ function is used to fine-tune the frequency spectrum of sounds delivered to each processor output to compensate both for the known frequency response characteristics of the flat panel radiators and for variations in room acoustics from zone to zone. The goal is to insure a flat response from each flat panel radiator and to insure a consistent low spatial variation of sound in every zone regardless of the room acoustics within the zone.

Each output EQ is user accessible through virtual faders in the GUI and comprises a 28 band ⅓ octave equalizer within a frequency band from 40 Hz to 20 kHz, allowing for precise shaping of the frequency spectrum at each processor output. When adjusting system performance with the output EQs, the frequency response characteristics of the flat panel radiators of the system are first compensated for to insure a flat radiator response. This is done by selecting an EQ curve with the output EQ faders that is the inverse of the known frequency response curve of the flat panel radiators. For example, it may be known that the frequency response of a particular model of flat panel radiator to be used with the system exhibits a gradual dip at a frequency around 300 Hz. To compensate for this, the output EQs are adjusted to provide a corresponding gradual level rise at 300 Hz that is the inverse of the dip in the flat panel radiator frequency response. The dip is thus compensated for and the radiator is tuned to produce a flat response without its characteristic 300 Hz dip. This same process is carried out across the frequency response spectrum of the radiators to insure a uniform, consistent, and high fidelity flat radiator response. To aid in this tuning, the GUI provides for the storing of preset EQ curves that can be the inverse of known frequency response curves of the flat panel radiators usable with the system. A stored curve may simply be selected and the faders of the graphic EQ are set accordingly. Thus, the processor is designed to work specifically with a known class of flat panel sound radiators such that the inverse frequency response of those radiators can be specifically applied to the processor signal so that the desired output spectrum can be reproduced. This is not possible with traditional processors since their design does not have control over or know what type of speaker will be used by the sound system designer.

Once the graphic EQs 69 have been adjusted to compensate for the frequency response of the flat panel radiators, then adjustments may be made to compensate for the varying room acoustics in the different zones serviced by the system. For example, a client waiting room may have a tile floor and highly reflective walls and other surfaces. Such a room is said to be a live room. Since sound reflection is greater at higher frequencies, sound in such a room tends to sound as if the high frequencies are overemphasized. To compensate for such a room, the graphic EQ 69 for the processor output feeding that room may be adjusted to reduce slightly the output levels at higher frequencies. Thus, the sound, say background music, produced by the flat panel radiators in the waiting room sounds natural, pleasant, and full rather than hissy.

Conversely, another zone may be an open plan office space with carpet, absorptive partitions, and absorptive walls. Such a room is said to be a dead room and is characterized by a perceived lack of high frequency content in sounds produced in the room, i.e. a dull sound. In this case, the room acoustics may be compensated for by increasing, in the graphic EQ for that zone, levels at the higher frequencies and, perhaps, reducing them a bit at lower frequencies to produce a full natural sound within the zone.

It will thus be seen that the room acoustics for every zone of the space serviced by the system of this invention may be compensated for with appropriate fine adjustments of the ⅓ octave graphic EQs 69. As a result, the sounds produced by the system, be they masking sounds, pages, or background music, are consistent from zone to zone and in every zone are full, natural, and of a much higher fidelity that with prior art sound distribution systems.

The eight outputs of the processor may either be line level analog outputs 71 or S/PDIF digital audio outputs 72. The digital outputs are provided for use with power amplifiers specially designed for use with the system of the invention. These amplifiers receive digital audio inputs directly from the processor digital outputs 72 and provide the additional advantage of communicating their operating status back to the amp control and monitor processor 100 of the processor for use in the diagnostic functions discussed above. Analog outputs 71 are provided for use with third party power amplifiers that receive line level audio inputs. When using third party power amplifiers, the status of the power amps is not communicated back to the processor. In any event, the two output options of the system provides for maximum flexibility in the choice of power amplifiers to be used.

Additional useful features of the system of this invention, although not discussed in detail above, are provided. For example, an "all mute" function is provided and may be activated by closing a dedicated contact closure on the chassis of the processor. When activated, the all mute function mutes all signals at all outputs of the processor, thereby silencing the entire system. It is provided for use in cities where the local fire codes or fire department requires that all audio be shut off in a building when the fire alarm panel is activated and being used by fire department personnel during an emergency. Providing this feature in the system simplifies the design and work of architects and contractors to achieve this mandated functionality in cities where it applies. Another feature relates to page priorities. The various types of pages (i.e. microphone, telco, master page, and all mute) are assigned priorities and higher priority pages take precedence over lower priority pages. For example, the all mute function is a priority 1 page in the preferred embodiment and, when activated, terminates all other pages that may be in progress and disables other page requests as long as the all mute function is active. Similarly, a microphone page is a priority 2 page and takes precedence over a telco page (a telco page in progress will be terminated when a microphone page is selected and the telco input will return a busy signal to a caller if a telco page is attempted during a microphone page). These priorities may be hardwired in the system, or, alternatively, my be programmable by an installer or user in the GUI.

The present invention has been described herein in terms of preferred embodiments, system components, and methodologies that represent the best mode known to the inventors of carrying out the invention. It will be understood, however, that various additions, deletions, and variations of the illustrated embodiments might well be made by those of skill in the art within the scope of the invention. Accordingly, the preferred embodiments disclosed herein should not be interpreted as limiting, but instead only exemplary of the unique features and methodologies of the invention. For instance, the preferred system configuration includes the use of high fidelity flat panel radiators projecting sound directly into the space to avoid troublesome plenum effects common in prior art systems. However, the processor and power amplifiers of the system of the present invention, with their programmed signal processing features, might be used directly with a plenum mounted cone-type speaker installation with improved, albeit not optimum, results. Other applications might include whole house stereo systems in consumer applications. The spirit and scope of the invention is determined not by the preferred embodiments but rather by the claims.

What is claimed is:

1. A method of producing masking sound within a space for masking distracting noise and providing enhanced speech privacy within the space, said method comprising the steps of: (a) providing at least one transducer arranged to project sound directly into the space; (b) determining a desired spectrum for masking sound to be produced within the space; (c) producing a first noise signal; (d) subjecting the first noise signal to a pre-filter having substantially the same spectrum as the desired spectrum determined in step (b) to produce a first masking signal; (e) amplifying the first masking signal; and (f) driving the at least one transducer with the amplified first masking signal to produce within the space a first masking sound having substantially the desired spectrum determined in step (b), wherein the desired spectrum and the spectrum of the pre-filter have consistently decreasing negative dB slopes of between −2 dB per octave and −6 dB per octave within a predetermined frequency range.

2. The method of claim 1 and wherein the first noise signal produced in step (c) is a white noise signal.

3. The method of claim 1, wherein the first noise signal produced in step (c) is a pink noise signal.

4. The method of claim 1, wherein the at least one transducer is a flat panel sound radiator.

5. The method of claim 4, wherein the flat panel sound radiator is mounted within a suspended ceiling grid of the space.

6. The method of claim 1, wherein: step (c) further comprises producing a second noise signal that is uncorrelated with the first noise signal; step (d) further comprises subjecting the second noise signal to a pre-filter having substantially the same spectrum as the desired spectrum determined in step (b) to produce a second masking signal; step (e) further comprises amplifying the second masking signal; and step (f) further comprises driving at least one transducer within the space with the amplified second masking signal to produce within the space a second masking sound having substantially the desired spectrum determined in step (b), the second masking sound being uncorrelated with the first masking sound to minimize sonic interference between the first and second masking sounds.

7. The method of claim 6, wherein the second noise signal is a white noise signal.

8. The method of claim 6, wherein the second noise signal is a pink noise signal.

9. The method of claim 1, wherein the desired spectrum and the spectrum of the pre-filter have slopes of about −4 dB per octave within the predetermined frequency range.

10. The method of claim 1, wherein the predetermined frequency range corresponds substantially to the frequency range of human speech.

11. The method of claim 1, wherein the predetermined frequency range is between about 200 Hz and about 5000 Hz.

12. The method of claim 11, wherein the pre-filter has skirt regions outside the predetermined frequency range and wherein the pre-filter falls off within the skirt regions at a predetermined dB rate.

13. The method of claim 12, wherein the pre-filter falls off by at least 12 dB per octave within the skirt regions.

14. The method of claim 1, wherein the desired spectrum in step (b) falls within a predetermined frequency range.

15. The method of claim 14, wherein the predetermined frequency range is substantially the frequency range of human speech.

16. A method of generating a masking signal to be amplified and reproducing in a space to mask distracting sounds and enhance speech privacy within the space, said method comprising the steps of: (a) receiving a noise signal; and (b) pre-filtering the source noise with a pre-filter having a consistently decreasing negative dB slope to produce the masking signal, wherein the pre-filter has a slope within a predetermined frequency range of between −2 dB per octave and −6 dB per octave.

17. The method of claim 16, wherein the noise signal is white noise.

18. The method of claim 16, wherein the noise signal is pink noise.

19. The method of claim 16, wherein the pre-filter has a slope of about −4 dB per octave.

20. The method of claim 16, wherein the predetermined frequency range substantially corresponds to the frequency range of the human voice.

21. A method of generating a masking signal to be amplified and reproducing in a space to mask distracting sounds and enhance speech privacy within the space, said method comprising the steps of: (a) receiving a noise signal; and (b) pre-filtering the source noise with a pre-filter having a consistently decreasing negative dB slope to produce the masking signal, wherein the pre-filter has a slope within a predetermined frequency range of between −2 dB per octave and −6 dB per octave and the predetermined frequency range is between about 200 Hz and about 5000 Hz.

22. The method of claim 21, wherein the pre-filter falls off at a rate of at least 12 dB per octave within skirt regions outside the predetermined frequency range.

23. In a masking sound system wherein masking signals are amplified and reproduced within a space through flat panel radiators mounted within the suspended ceiling system of the space, a method of improving the efficiency of the system for masking distracting sounds and enhancing speech privacy while reducing the annoying characteristics of the masking sound within the space, the method comprising subjecting the masking signals to a pre-filter having a consistently decreasing negative dB slope of between −2 dB per octave and −6 dB per octave within a frequency range substantially corresponding to the frequency range of human speech.

24. The method of claim 23, wherein the pre-filter has a slope of about −4 dB per octave.

* * * * *